United States Patent
Katou et al.

(10) Patent No.: US 11,603,630 B2
(45) Date of Patent: Mar. 14, 2023

(54) SURFACE SIZING AGENT FOR PAPERMAKING

(71) Applicant: KURITA WATER INDUSTRIES LTD., Tokyo (JP)

(72) Inventors: Tomonari Katou, Tokyo (JP); Chigusa Taguchi, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 200 days.

(21) Appl. No.: 17/256,653

(22) PCT Filed: Apr. 10, 2019

(86) PCT No.: PCT/JP2019/015610
§ 371 (c)(1),
(2) Date: Dec. 29, 2020

(87) PCT Pub. No.: WO2020/059194
PCT Pub. Date: Mar. 26, 2020

(65) Prior Publication Data
US 2021/0262170 A1 Aug. 26, 2021

(30) Foreign Application Priority Data
Sep. 18, 2018 (JP) .............. JP2018-173204

(51) Int. Cl.
| D21H 21/18 | (2006.01) |
| D21H 21/16 | (2006.01) |
| D21H 17/14 | (2006.01) |
| D21H 17/19 | (2006.01) |
| D21H 17/28 | (2006.01) |
| D21H 17/00 | (2006.01) |

(52) U.S. Cl.
CPC ............ *D21H 21/16* (2013.01); *D21H 17/14* (2013.01); *D21H 17/19* (2013.01); *D21H 17/28* (2013.01); *D21H 17/72* (2013.01)

(58) Field of Classification Search
CPC ........ D21H 17/19; D21H 21/16; D21H 17/37; D21H 17/72; D21H 17/28; D21H 17/14; D21H 19/20; C08F 2/44; C08F 251/00; C08F 212/08; C08F 220/1804; C08F 220/20
USPC ..................................................... 162/164.7
See application file for complete search history.

(56) References Cited

U.S. PATENT DOCUMENTS

| 6,114,417 | A  | 9/2000  | O'Toole et al.  |
| 6,426,381 | B1 | 7/2002  | Konig et al.    |
| 6,753,377 | B1 | 6/2004  | Niinikoski et al. |
| 2010/0236736 | A1 | 9/2010 | Brockmeyer et al. |
| 2012/0180970 | A1 | 7/2012 | Song et al. |
| 2013/0267632 | A1 | 10/2013 | Kruckel et al. |
| 2014/0023872 | A1 | 1/2014 | Sodeyama et al. |
| 2014/0275415 | A1 | 9/2014 | Cimpeanu et al. |
| 2017/0275387 | A1 | 9/2017 | Parcq et al. |
| 2018/0051418 | A1 | 2/2018 | Hayes et al. |
| 2018/0251945 | A1 | 9/2018 | Lepo et al. |

FOREIGN PATENT DOCUMENTS

| CN | 1323318 | 11/2001 |
| CN | 103459717 | 12/2013 |
| CN | 103890020 | 6/2014 |
| CN | 107313292 | 11/2017 |
| CN | 107567485 | 1/2018 |
| EP | 1165642 | 1/2002 |
| EP | 2802611 | 10/2016 |
| JP | S5434408 | 3/1979 |
| JP | S58132198 | 8/1983 |
| JP | H10158993 | 6/1998 |
| JP | 2014501289 | 1/2014 |
| JP | 2014163002 | 9/2014 |
| JP | 2017020132 | 1/2017 |
| TW | 201235093 | 9/2012 |
| WO | 2012080145 | 6/2012 |

OTHER PUBLICATIONS

"International Search Report (Form PCT/ISA/210) of PCT/JP2019/015610," dated Jun. 18, 2019, with English translation thereof, pp. 1-4.
"Office Action of Japan Counterpart Application", dated Mar. 24, 2020, with English translation thereof, p. 1-p. 6.
Office Action of China Counterpart Application, with English translation thereof, dated Mar. 24, 2021, pp. 1-17.
"Search Report of Europe Counterpart Application", dated May 11, 2022, p. 1-p. 9.
"Office Action of Korea Counterpart Application" with English translation thereof, dated Aug. 11, 2022, p. 1-p. 8.

*Primary Examiner* — Mark Halpern
(74) *Attorney, Agent, or Firm* — JCIPRNET

(57) ABSTRACT

To provide a surface sizing agent for papermaking, which has good low foamability and mechanical stability and has an excellent sizing effect. The surface sizing agent for papermaking is a surface sizing agent for papermaking, comprising a composition obtained by polymerizing unsaturated monomers in the presence of a starch, wherein the amount of the starch is 25 to 40 mass % based on the total amount of the starch and the unsaturated monomers, the unsaturated monomers comprise at least a styrenic compound and a (meth)acrylic ester compound, and the amount of the styrenic compound is 10 mass % or more and less than 30 mass %, and the amount of the (meth)acrylic ester compound is 20 to 50 mass %, based on the total amount of the starch and the unsaturated monomers.

10 Claims, No Drawings

SURFACE SIZING AGENT FOR PAPERMAKING

CROSS-REFERENCE TO RELATED APPLICATION

This application is a 371 application of an international PCT application serial no. PCT/JP2019/015610, filed on Apr. 10, 2019, which claims the priority benefit of Japan application JP2018-173204, filed on Sep. 18, 2018. The entirety of each of the above-mentioned patent applications is hereby incorporated by reference herein and made a part of this specification.

TECHNICAL FIELD

The present invention relates to a surface sizing agent used in the papermaking process.

BACKGROUND ART

In recent years, a demand for surface quality of paper, printability thereof, etc. has been further increasing. A so-called "surface sizing agent" is a paper surface treatment agent used for imparting water resistance to a paper surface or preventing bleeding of ink.

At present, as such surface sizing agents, various types are prepared according to the difference in quality required for paper, etc., and it is necessary to select an appropriate surface sizing agent according to the quality of paper required, the papermaking conditions, and the like.

This surface sizing agent is directly applied to a surface of paper and dried in the paper production process. For the application of the surface sizing agent to paper, a coating system with high shear force is frequently used, but in this coating step, the surface sizing agent receives mechanical shear force while being circulated in a coating device, and therefore, if the resistance is low, emulsion particles are broken and an agglomerate (stain) occurs, thereby exerting evil influence on workability.

Accordingly, from the viewpoint of workability, the surface sizing agent is required to have not only a basic sizing effect (bleeding prevention effect) but also mechanical stability and low foamability during coating when the surface sizing agent is used in the paper production.

For example, in Patent Literature 1, a surface treatment agent for paper, comprising a graft polymer of starch and an ethylenically unsaturated monomer having a carboxyl group and the like is disclosed.

In Patent Literature 2, disclosed is a surface treatment agent for paper, comprising a water-soluble graft polymer of a monomer mixture and water-dispersible polysaccharides, the monomer mixture containing, as essential components, 30 to 80 of a styrenic compound and 20 to 70 mol % of at least one monomer selected from ethylenically unsaturated monomers having a carboxyl group.

In Patent Literature 3, disclosed is a surface sizing agent for papermaking, which contains an aqueous polymer emulsion obtained by subjecting an unsaturated monomer to emulsion polymerization in the presence of starch, a polymerization initiator and a chain transfer agent, and is characterized in that the starch is starch (A) having been adjusted to have an intrinsic viscosity of 0.1 to 0.9 using an inorganic peroxide, the unsaturated monomer is an unsaturated monomer mixture (B) comprising 3 to 30 weight % of a styrenic compound (with the proviso that the total amount of the unsaturated monomer mixture is 100 weight %) and 70 to 97 weight % of a (meth)acrylic ester compound, the polymerization initiator is a polymerization initiator (C) composed of hydrogen peroxide and a heavy metal salt, and the starch (A) contains an aqueous polymer emulsion obtained by subjecting 80 to 200 parts by weight of the starch based on 100 parts by weight of the total amount of the unsaturated monomer mixture (B) to emulsion polymerization.

In Patent Literature 3, it is described that a surface sizing agent for papermaking, which has good mechanical stability in the coating system with high shear force (by gate roll, size press or the like), rarely suffers foaming during the coating and has an excellent sizing effect, can be provided, and a paper obtained by applying a surface sizing agent to a base paper can be provided.

CITATION LIST

Patent Literature

PTL1: JPS 54-34408 A
PTL2: JPH 10-158993 A
PTL3: JP 2014-163002 A

SUMMARY OF INVENTION

Technical Problem

However, development of a surface sizing agent having good low foamability and mechanical stability and having a high sizing effect is insufficient. Then, it is a main object of the present invention to provide a surface sizing agent for papermaking, which has good low foamability and mechanical stability and has an excellent sizing effect.

Solution to Problem

As a result of earnest studies, the present inventor has succeeded in obtaining a surface sizing agent for papermaking, which has good low foamability and mechanical stability and has an excellent sizing effect, by using, as a surface sizing agent, a composition for paper, which is obtained by polymerizing an unsaturated monomer in the presence of a starch and in which the proportion of the starch is 25 to 40 mass %, the proportion of a styrenic compound is 10 mass % or more and less than 30 mass %, and the proportion of a (meth)acrylic ester compound is 20 to 50 mass %, based on the total amount of the starch and the unsaturated monomers, to thereby complete the present invention. In particular, the composition of the present invention has an advantage of having an excellent sizing effect such that the degree of ink bleeding is low while water permeability of paper is suppressed.

That is to say, the present invention is as the following [1] to [6].

[1] A surface sizing agent for papermaking, comprising a composition obtained by polymerizing unsaturated monomers in the presence of a starch, wherein the amount of the starch is 25 to 40 mass % based on the total amount of the starch and the unsaturated monomers, the unsaturated monomers comprise at least a styrenic compound and a (meth)acrylic ester compound, and the amount of the styrenic compound is 10 mass % or more and less than 30 mass %, and the amount of the (meth)acrylic ester compound is 20 to 50 mass %, based on the total amount of the starch and the unsaturated monomers.

[2] The surface sizing agent according to the above [1], wherein the (meth)acrylic ester compound comprises a (meth)acrylic acid C1-C8 alkyl ester.
[3] The surface sizing agent according to the above [1] or [2], wherein the (meth)acrylic ester compound comprises 50 mass % or more of a (meth)acrylic acid C3-C4 alkyl ester.
[4] The surface sizing agent according to any one of the above [1] to [3], wherein the starch is a starch having been subjected to oxidation treatment and/or enzymatic treatment.
[5] The surface sizing agent according to any one of the above [1] to [4], wherein the unsaturated monomers further comprise an ionic ethylene-based unsaturated monomer, and the amount of the ionic ethylene-based unsaturated monomer is less than 10 mass % based on the total amount of the starch and the unsaturated monomers.
[6] A paper comprising the surface sizing agent for papermaking according to any one of the above [1] to [5].

Advantageous Effects of Invention

According to the present invention, a surface sizing agent for papermaking which has good low foamability and mechanical stability and has an excellent sizing effect can be provided. The effect described here is not always limited, and the effect may be any of effects described in the present specification.

DESCRIPTION OF EMBODIMENTS

A preferred embodiment of the present invention will be described. However, the present invention is not limited to the following preferred embodiment, and modifications can be freely made within the scope of the present invention. The embodiment described below shows one example of typical embodiments of the present invention, and it should not be construed that the scope of the present invention is limited by the embodiment.

<1. Surface Sizing Agent According to the Present Embodiment>

The surface sizing agent according to the present embodiment comprises a composition obtained by polymerizing unsaturated monomers in the presence of a starch.

In the composition to be contained in the surface sizing agent (also referred to as a "composition for a surface sizing agent" hereinafter), (i) the amount of the starch is 25 to 40 mass % based on the total amount of the starch and the unsaturated monomers, (ii) the unsaturated monomer comprises at least a styrenic compound and a (meth)acrylic ester compound, and the amount of the styrenic compound is 10 mass % or more and less than 30 mass %, and the amount of the (meth)acrylic ester compound is 20 to 50 mass %, based on the total amount of the starch and the unsaturated monomers. The unsaturated monomer may further comprise an ionic ethylene-based unsaturated monomer, and the amount of the ionic ethylene-based unsaturated monomer is preferably less than 10 mass % based on the total amount of the starch and the unsaturated monomers.

<1-1. Starch>

Examples of the starch used in the present embodiment include, but are not limited to, corn starch, potato starch, tapioca starch, wheat starch, rice starch, sago starch, and waxy maize starch; and a processed starch obtained by processing these starches. Examples of the processed starch include oxidized starch, cationized starch, phosphoric acid modified starch, carboxymethylated starch, hydroxyethylated starch, carbamylethylated starch, dialdehyde starch, and acetic acid modified starch. One or two or more may be selected from these, and used singly or in combination of a plurality of them. The above starch can be obtained from various grains, and as these starches and processed starches, commercial products may be used.

The starch used in the present embodiment is preferably a starch obtained by further chemically and/or physically treating the aforesaid starch for decomposition (also referred to as "starch decomposition products" hereinafter). By lowering a molecular weight of the starch while preparing a composition, the composition having better low foamability and mechanical stability and having a more excellent sizing effect can be obtained.

The molecular weight of the starch decomposition product used in the present embodiment is preferably 1,000 to 100,000, and more preferably 2,000 to 50,000. The molecular weight of the starch can be measured by, for example, gel permeation chromatography (pullulan standard).

It is preferable to decompose the aforesaid starch before the initiation of monomer polymerization, but they may be decomposed during the monomer polymerization. For this decomposition, one or two or more may be selected from the group consisting of oxidation treatment, heat treatment, acid decomposition treatment and enzymatic treatment, and may be used singly or in combination of a plurality of them to treat the starch. Among them, a starch having been subjected to oxidation treatment and/or enzymatic treatment is preferred, a starch having been subjected to oxidation treatment and enzymatic treatment is more preferred, and a starch having been subjected to oxidation treatment and then to enzymatic treatment is still more preferred. Owing to this, a composition having better low foamability and mechanical stability and having a more excellent sizing effect can be obtained.

The oxidation treatment is not particularly limited, and for example, it is possible to carry out the treatment using an oxidizing agent (inorganic peroxide) generally used in the production of oxidized starch. Examples of the oxidizing agents include a hypochlorite, a peroxodisulfate and a hydrogen peroxide solution, and one or two or more may be selected from these and may be used singly or in combination of a plurality of them.

The degree of substitution (DS) of the cationic group or the anionic group of the oxidation-treated starch is preferably 1 or less, more preferably 0.4 or less, still more preferably 0.001 to 0.1, and even more preferably 0.03 to 0.05.

The enzymatic treatment is not particularly limited, and it is possible to carry out the treatment using an enzyme generally used in enzymatic treatment of starch. As the enzyme, amylase can be used, and examples of the amylases include α-amylase, β-amylase, glucoamylase and isoamylase, and one or two or more may be selected from these and may be used singly or in combination of a plurality of them. Among them, α-amylase is preferred.

The enzymatic treatment method is not particularly limited, and for example, to 100 parts by mass of the aforesaid starch (preferably oxidized starch), 0.1 to 10 parts by mass of a 1 to 5% enzyme solution (preferably α-amylase) is added under the conditions of a reaction temperature of 70 to 90° C., and they are stirred for about 15 minutes to 2 hours. The concentration of the enzyme solution is preferably 2 to 3%, the addition amount of the enzyme solution is preferably 0.1 to 1 part by mass, and the stirring time is preferably 0.5 to 1.5 hours.

Regarding the content of the starch used in the present embodiment, the lower limit of the content of the starch is 25 mass % or more, preferably 30 mass % or more, and the upper limit of the content of the starch is 40 mass % or less, preferably 37 mass % or less, in the total amount (100 mass %) of the starch and the unsaturated monomers, and the content range is preferably 25 to 40 mass %, more preferably 28 to 38 mass %. Owing to this, a composition having better low foamability and mechanical stability and having a more excellent sizing effect can be obtained.

<1-2. Unsaturated Monomers>

The unsaturated monomers used in the present embodiment are not particularly limited, and an ethylene-based unsaturated monomer is preferred. Examples of the ethylene-based unsaturated monomer include a styrenic compound, a (meth)acrylic ester compound, and an ionic ethylene-based unsaturated monomer.

The unsaturated monomers used in the present embodiment contain at least a styrenic compound and a (meth)acrylic ester compound, and in the unsaturated monomers used in the present embodiment, a styrenic compound and a (meth)acrylic ester compound are preferably main components.

The unsaturated monomers used in the present embodiment may further contain an unsaturated monomer other than a styrenic compound and a (meth)acrylic ester compound.

The content ratio by mass between the starch and the unsaturated monomers is preferably starch 25 to 40:unsaturated monomers 31 to 90, more preferably starch 28 to 40:unsaturated monomers 40 to 90, and still more preferably starch 28 to 40:unsaturated monomers 45 to 75.

[1-2-1. Styrenic Compound]

The styrenic compound used in the present embodiment may be unsubstituted or may be substituted by a substituent, and specific examples include styrene and substituted styrene. Examples of the substituents include straight-chain or branched chain alkyl groups having 1 to 4 carbon atoms (e.g., methyl group, ethyl group); halogen atoms (e.g., chlorine atom, bromine atom, iodine atom); and straight-chain or branched chain alkoxyl groups having 1 to 4 carbon atoms (e.g., methoxy group, ethoxy group).

Examples of the substituted styrene include styrene substituted by an alkyl group having 1 to 4 carbon atoms (e.g., α-methylstyrene), styrene halogenated on a benzene ring (e.g., chlorostyrene), and styrene substituted by alkyl having 1 to 4 carbon atoms on a benzene ring (e.g., vinyltoluene).

One or two or more may be selected from the above styrenic compounds, and may be used singly or in combination of a plurality of them.

Among them, styrene (unsubstituted styrene) is preferred from the viewpoint of cost, but another substituted styrene may be contained as long as the effects of the present invention are not impaired. By using styrene, a composition having better low foamability and mechanical stability and having a more excellent sizing effect can be obtained.

Regarding the content of styrenic compound used in the present embodiment, the lower limit of the content of the styrenic compound is 10 mass % or more, preferably 15 mass % or more, more preferably 20 mass % or more, and the upper limit of the content of the styrenic compound is less than 30 mass %, preferably 29 mass % or less, more preferably 28 mass % or less, in the total amount (100 mass %) of the starch and the unsaturated monomers, and the content range is preferably 10 to 29 mass %, more preferably 20 to 28 mass %. Owing to this, a composition having better low foamability and mechanical stability and having a more excellent sizing effect can be obtained.

[1-2-2. (Meth)Acrylic Ester Compound]

The (meth)acrylic ester compound used in the present embodiment is not particularly limited, and is preferably a (meth)acrylic acid alkyl ester. The alkyl group may be any of straight-chain and branched chain.

The number of carbon atoms of the alkyl group of the (meth)acrylic acid alkyl ester is preferably 1 to 18, and specifically, a (meth)acrylic acid C1-C18 alkyl ester is preferred.

The (meth)acrylic ester compound used in the present embodiment can also contain at least one, or two or more selected from (meth)acrylic acid C1-C18 alkyl esters.

The content ratio by mass of (meth)acrylic acid C1-C4 alkyl ester in the total amount of the (meth)acrylic ester compound is preferably 50 mass % or more, more preferably 55 mass % or more, still more preferably 80 mass % or more, and even more preferably 90 mass % or more.

The content ratio by mass of (meth)acrylic acid C3-C4 alkyl (more preferably C3 alkyl) ester in the total amount of the (meth)acrylic ester compound is preferably 50 mass % or more, more preferably 55 mass % or more, still more preferably 80 mass % or more, and even more preferably 90 mass % or more.

Examples of the (meth)acrylic acid C1-C18 alkyl ester include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, sec-butyl (meth)acrylate and 2-ethylhexyl (meth)acrylate, and among them, one or two or more can be used.

From the viewpoints of glass transition point and sizing effect, a (meth)acrylic acid C1-C18 alkyl ester is preferred, and a (meth)acrylic acid C1-C4 alkyl ester is more preferred. Among the (meth)acrylic ester compounds, a (meth)acrylic acid C3-C4 alkyl ester is still more preferred. A C3 alkyl group is even more preferred, and as more preferred specific examples, one or two or more selected from the group consisting of t-butyl (meth)acrylate, n-butyl (meth)acrylate and isobutyl (meth)acrylate are preferred from the viewpoint of better sizing effect, and another (meth)acrylic ester compound may be contained as long as the effects of the present invention are not impaired.

One or two or more may be selected from the (meth) acrylic ester compounds, and may be used singly or in combination of a plurality of them. Owing to this, a composition having better low foamability and mechanical stability and having a more excellent sizing effect can be obtained.

Regarding the content of (meth)acrylic ester compound used in the present embodiment, the lower limit of the content of the (meth)acrylic ester compound is 20 mass % or more, preferably 30 mass % or more, more preferably 35 mass % or more, and the upper limit of the content of the (meth)acrylic ester compound is 50 mass % or less, preferably 48 mass % or less, more preferably 47 mass % or less, based on the total amount of the starch and the unsaturated monomers. The content range of the (meth)acrylic ester compound is preferably 20 to 50 mass %, more preferably 30 to 48 mass %, and still more preferably 30 to 39 mass %. When the ionic unsaturated monomer described later is contained, the range is preferably 30 to 39 mass %.

Owing to this, a composition having better low foamability and mechanical stability and having a more excellent sizing effect can be obtained.

[1-2-3. Unsaturated Monomers Other than the Styrenic Compound and the (Meth)Acrylic Ester Compound]

The unsaturated monomers other than the styrenic compound and the (meth)acrylic ester compound, which are used in the present embodiment, are not particularly limited. As the unsaturated monomers other than these, an ionic ethylene-based unsaturated monomer may be contained. The ionic ethylene-based unsaturated monomer is preferably anionic and/or cationic.

Moreover, the unsaturated monomers according to the present embodiment preferably contain a predetermined amount or less of an anionic (e.g., having carboxyl group) ethylene-based unsaturated monomer.

Examples of the anionic ethylene-based unsaturated monomer include carboxylic acid-based ones, such as (meth)acrylic acid, crotonic acid, maleic acid, fumaric acid and itaconic acid; and sulfonic acid-based ones, such as styrenesulfonic acid and vinylsulfonic acid. Among them, an ethylene-based unsaturated carboxylic acid monomer is preferred.

The anionic unsaturated monomers may be partially or completely neutralized salts, and examples of neutralizing agents include caustic soda, caustic potash, sodium carbonate, sodium hydrogen carbonate, calcium hydroxide and ammonia. Examples of the salts include alkali metal salts (sodium, potassium), alkaline earth metal salts (calcium), and ammonium salts (ammonia).

One or two or more may be selected from the anionic unsaturated monomers, and may be used singly or in combination of a plurality of them.

Among them, (meth)acrylic acid is preferred from the viewpoint of the effects of the present invention. Owing to this, a composition having better low foamability and mechanical stability and having a more excellent sizing effect can be obtained.

The upper limit of the content of the ionic ethylene-based unsaturated monomer used in the present embodiment is preferably less than 10 mass %, more preferably 5 mass % or less, still more preferably 4 mass % or less, even more preferably 2 mass % or less, and the lower limit of the content of the ionic ethylene-based unsaturated monomer is preferably 0.01 mass % or more, more preferably 0.1 mass % or more, still more preferably 0.5 mass % or more, even more preferably 1 mass % or more, based on the total amount of the starch and the unsaturated monomers. The content range is preferably 0.1 to 4 mass %.

It is thought from Examples described later that when the amount of the ionic ethylene-based unsaturated monomer used is small, fixing to fibers due to impartation of ionic property is easily improved, and on the other hand, when the amount thereof is excessive, hydrophobicity decreases and the sizing effect tends to be decreased. Owing to this, a composition having better low foamability and mechanical stability and having a more excellent sizing effect can be obtained.

[1-2-4. Content Ratio by Mass of Unsaturated Monomers (Proportion)]

The content ratio by mass between the styrenic compound and the (meth)acrylic ester compound used in the present embodiment is preferably styrenic compound 10 to 30:(meth)acrylic ester compound 20 to 50, and more preferably styrenic compound 20 to 28:(meth)acrylic ester compound 30 to 48.

The content ratio by mass of styrenic compound:(meth) acrylic ester compound:anionic ethylene-based unsaturated monomer used in the present embodiment is preferably styrenic compound 10 to 30:(meth)acrylic ester compound 20 to 50:anionic ethylene-based unsaturated monomer more than 0 and less than 10, and more preferably styrenic compound 20 to 28:(meth)acrylic ester compound 20 to 48:anionic ethylene-based unsaturated monomer 1 to 4.

<1-3. Method for Producing Composition for Surface Sizing Agent>

An active substance to be contained in the surface sizing agent for papermaking of the present embodiment is a composition (composition for a surface sizing agent) obtained by polymerizing unsaturated monomers in the presence of a starch. The composition for a surface sizing agent can be produced by using the aforesaid starch and unsaturated monomers as raw materials. The composition can be obtained based on the aforesaid raw materials, the contents of the raw materials and the content ratio by mass of the raw materials. Description of constitutions common to those of the aforesaid <Starch> and the aforesaid <Unsaturated monomers> is omitted in some cases.

[1-3-1. Polymerization]

The composition for a surface sizing agent of the present embodiment can be obtained by utilizing known polymerization reaction. It is possible to obtain the composition by polymerization reaction (preferably radical polymerization reaction) using a polymerization initiator (e.g., dihalogen, azo compound, organic peroxide, redox initiator).

The composition of the present embodiment has an advantage that the composition can be obtained by polymerization reaction with a polymerization initiator without using an emulsifier and a chain transfer agent, as shown in Examples described later. When the composition is obtained, an emulsifier and/or a chain transfer agent may be used.

As the chain transfer agent, a known one can be used without particular limitation, and examples thereof include polyethers (e.g., polyethylene glycol), alkylmercaptans (e.g., dodecylmercaptan) and terpenes (e.g., 2,4-diphenyl-4-methyl-1-pentene), and from these, one or two or more can be selected. Among them, a terpene-containing chain transfer agent is preferred from the viewpoint of dispersion stability.

The amount of the chain transfer agent used is usually about 0.01 to 3 parts by mass based on 100 parts by mass of the total amount of the unsaturated monomers.

As the emulsifier, a commercial product enabling emulsion polymerization only needs to be used, and various known nonionic, anionic, cationic or amphoteric surfactants, or reactive emulsifiers can be used. The emulsion polymerization is generally carried out by mixing a solvent such as water, a sparingly solvent-soluble monomer and an emulsifier, and adding a polymerization initiator.

The amount of the emulsifier (surfactant) used is usually about 0.01 to 5 parts by mass based on 100 parts by mass of the total amount of the unsaturated monomers.

In the present embodiment, the polymerization may be emulsion polymerization or polymerization reaction analogous thereto, and examples of the analogous polymerization reactions include miniemulsion polymerization, microemulsion polymerization, emulsifier-free emulsion polymerization and suspension polymerization.

As an example of the method for producing a composition for a surface sizing agent of the present embodiment, the following can be given, but the composition of the present embodiment and the production method are not limited thereto.

In the polymerization of the present embodiment, it is preferable to add the unsaturated monomer to an aqueous solution containing the starch and to add the polymerization initiator thereto. When a plurality of the unsaturated monomers is present, they may be added separately or after they are mixed.

In the polymerization of the present embodiment, it is preferable to carry out, as pretreatment, adjustment of a molecular weight of the starch. In this pretreatment, description of constitution common to that of the <Starch> is omitted. For example, the starch contained in the aqueous solution may be subjected to decomposition by oxidation treatment and/or enzymatic treatment as pretreatment. When a starch having been subjected to decomposition by oxidation treatment and/or enzymatic treatment is used, commercial products of starch having been subjected to decomposition by oxidation treatment and/or enzymatic treatment may also be used.

The polymerization of the present embodiment is initiated by a polymerization initiator, and the polymerization initiator is not particularly limited and only needs to be one generally used for the polymerization of an unsaturated monomer. As the surface sizing agent, a water-soluble one is more easily applied to a paper, and therefore, it is preferable to obtain the composition of the present embodiment as an aqueous dispersion. On this account, it is preferable to use a water-soluble polymerization initiator in the polymerization of the present embodiment.

As the polymerization initiator, a water-soluble redox initiator capable of generating radicals at a low temperature is preferred because it is excellent in cost, sizing effect and dispersion stability.

The redox initiator is, for example, a combination of an oxidizing agent such as hydrogen peroxide and a reducing agent such as an iron(II) salt, a persulfate or sodium hydrogensulfite. The reducing agent is preferably, for example, a heavy metal salt such as a sulfuric acid salt of cerium, manganese, iron or copper.

It is preferable to use, as the polymerization initiator, hydrogen peroxide or a combination of hydrogen peroxide and a heavy metal salt. Another reducing agent, such as ascorbic acid, sodium formaldehyde sulfoxylate, sodium disulfate or sodium dithionite, may be additionally contained, when needed.

The amount of the polymerization initiator of the present embodiment used is not particularly limited and can be appropriately determined, but it is preferably 0.05 to 10 parts by mass, and more preferably 0.1 to 5 parts by mass, based on 100 parts by mass of the unsaturated monomers. The proportion of hydrogen peroxide in the polymerization initiator is usually 95 to 99 mass %.

In the polymerization of the present embodiment, an oxidizing agent and a reducing agent are usually used together as a redox initiator, but since the polymerization of the present embodiment is carried out in the presence of a starch, the starch acts as a reducing agent, and therefore, additional another reducing agent may not be used. By omitting the reducing agent, a dispersion of coarse particles is rarely produced, and the degree of polymerization rarely becomes insufficient, so that a better sizing effect is easily obtained, and it can be said that this is an advantage of using the starch in the present embodiment.

It is preferable to further use an organic peroxide in combination after the polymerization with the redox initiator, and the organic peroxide is preferably an oil-soluble and sparingly water-soluble free-radical initiator, and examples of the organic peroxides include tert-butyl hydroperoxide, benzoyl peroxide and dicumyl peroxide, and among them, tert-butyl hydroperoxide is preferred. By adding this after the polymerization with the redox initiator, the polymerization reaction is further accelerated, the amount of an unreacted unsaturated monomer is reduced, and the polymerization time can also be shortened. In order to adjust the degree of polymerization to thereby set the viscosity to a predetermined one, a chain transfer agent can also be used. The sparing water solubility of the organic peroxide preferably indicates that the degree of complete dissolution in water at 20° C. is less than 1 mass %.

The polymerization of the present embodiment may be any of continuous one and batch one.

The polymerization of the present embodiment is preferably carried out in an inert gas atmosphere, and examples of the inert gases include nitrogen gas and argon gas, and from the viewpoint of cost, nitrogen gas is preferably used.

It is possible to carry out the polymerization of the present embodiment preferably at a temperature of 30 to 110° C., more preferably 50 to 100° C., and still more preferably 70 to 95° C., and it is possible to carry out the polymerization preferably for 0.5 to 10 hours, more preferably 1 to 5 hours.

The emulsion polymerization of the present embodiment can be carried out by utilizing a known emulsion polymerization method. For example, after a starch is fed to a reaction vessel, a mixture of unsaturated monomers, a polymerization initiator, water, a chain transfer agent and an emulsifier are fed, and they are appropriately stirred at about 40 to 150° C. for about 2 to 12 hours to carry out emulsion polymerization reaction, whereby an aqueous polymer emulsion can be produced. The unsaturated monomers can be simultaneously or separately added and mixed through simultaneous feeding, divided titration, or the like.

Through the above, a composition for a surface sizing agent, which is an active substance of the surface sizing agent for papermaking according to the present embodiment, can be prepared.

It is preferable that the resulting composition have properties of pH of 1 to 8 (preferably pH of 2 to 4), a viscosity (rotational viscometer, 25° C. measurement) of 3 to 100 mPa·s (preferably 10 to 50 mPa·s), and a particle diameter of 40 to 150 nm (more preferably 70 to 100 nm) at a solids concentration of 25%. The composition having such properties is preferred from the viewpoints of mechanical stability, low foamability and sizing effect.

From the viewpoints of viscosity and particle diameter, the amount of the composition used is preferably 10 to 40 mass %, and more preferably 18 to 30 mass %, in the surface sizing agent for papermaking.

As shown in Examples described later, the composition not only has excellent evaluation of drop sizing degree and evaluation of pen writing sizing degree but also exhibits low foamability and high mechanical stability. From this, the composition has an excellent sizing effect such that the degree of ink bleeding is low while water permeability of paper is suppressed. That is to say, the composition of the present embodiment has better low foamability and mechanical stability, and can impart a more excellent sizing effect to paper.

The surface sizing agent of the present embodiment can be prepared by blending various additives, when needed, in addition to the composition for a surface sizing agent. Examples of the additives include an anti-foaming agent, an antiseptic, a chelating agent and a water-soluble aluminum-based compound.

In another aspect of the present embodiment, for the purpose of providing a surface sizing agent for papermaking or the like, the composition for a surface sizing agent or its use can be provided. Furthermore, the composition for a surface sizing agent of the present embodiment can be used as an active substance in a method of carrying out surface sizing treatment or a method of processing a paper surface, such as coating.

Moreover, the composition for a surface sizing agent can be used for producing various formulations or various compositions (e.g., surface sizing agent) which have the effects of the present invention or which are intended uses of the present invention.

<2. Coating Liquid of the Present Embodiment>

As a coating liquid containing the surface sizing agent for papermaking of the present embodiment, the surface sizing agent for papermaking may be used as it is or may be used after diluted, but if necessary, various additives can be blended. Examples of the additives include a paper strength additive, an anti-slip agent, an antiseptic, an anti-corrosive agent, a pH adjuster, an anti-foaming agent, a thickening agent, a filler, an antioxidant, a water resistant additive, a film-forming aid, a pigment and a dye.

Examples of the paper strength additives used in the coating liquid of the present embodiment include the aforesaid starch (e.g., starch or processed starch), celluloses (e.g., carboxymethyl cellulose), and water-soluble polymers (e.g., polyvinyl alcohols, polyacrylamides, sodium alginate), and from these, one or two or more can be selected. Among them, a starch is preferred because starch is contained in the composition of the present embodiment.

It is preferable that the surface sizing agent for papermaking of the present embodiment be usually used at a solids concentration in the coating liquid in the range of about 0.001 to 2 mass %, preferably 0.005 to 0.5 mass %.

It is preferable that in the coating liquid of the present embodiment, the paper strength additive be preferably contained in an amount of 5 to 30 mass %, more preferably 10 to 20 mass %.

<3. Paper of the Present Embodiment>

The paper of the present embodiment is one obtained by applying a coating liquid containing the composition of the present embodiment or the papermaking surface sizing agent of the present embodiment to a base paper through various known means.

The base paper is not particularly limited, and usually, an uncoated paper or paperboard using a wood cellulose fiber as a raw material can be used. The base paper is obtained from a papermaking pulp, and examples of the papermaking pulps include chemical pulps such as LBKP and NBKP, mechanical pulps such as GP and TMP, and waste paper pulps. Also, various internal chemicals, such as a filler, a sizing agent and a paper strength additive that are internally added to the base paper, are not particularly limited.

Examples of types of papers obtained by applying the composition or the surface sizing agent of the present embodiment to the base papers include recording papers, such as form paper, PPC paper and thermal recording paper; coated papers, such as art paper, cast coated paper and woodfree coated paper; wrapping papers, such as kraft paper and machine glazed poster paper, and other various papers (Western papers), such as notebook paper, book paper, printing paper and paper for newspaper; and boxboards, such as manilla board, white lined chip board and chip board, and paperboards, such as linerboard and corrugating medium.

The surface sizing agent for papermaking of the present embodiment can be applied to conventionally known coating methods for the aforesaid various base papers, such as impregnation method, size press method, gate roll method, bar coater method, calendering method and spraying method.

Since the surface sizing agent for papermaking of the present embodiment is excellent in mechanical stability, as described above, it can be preferably used also in a coating system with high shear force such as a high-speed machine (transfer type machine coating means such as rod metering size press coating system or gate roll coating system).

Through the above, a paper comprising the surface sizing agent for papermaking in the present embodiment can be obtained.

EXAMPLES

The embodiment of the present invention will be described with reference to the following examples and comparative examples. It should be construed that the scope of the present invention is in no way limited to those examples.

Example 1

(Preparation of Surface Sizing Agent)

In a reaction vessel equipped with a stirrer, a cooling pipe, a nitrogen introduction pipe, a thermometer and a dropping funnel, 440 parts of water were added to 60 parts of oxidized starch, and they were heated to 80° C. while stirring by the stirrer. Next, 0.3 part of 2.5% α-amylase was added, and stirring was carried out for 1 hour. Subsequently, 2.65 parts of acetic acid and 0.3 part of iron(II) sulfate heptahydrate were added, then a monomer mixture consisting of unsaturated monomers of 33 parts of styrene and 67 parts of t-butyl acrylate was prepared, and this monomer mixture and 18.8 parts of a 15% hydrogen peroxide solution (polymerization initiator) were dropwise added into the reaction vessel over a period of 4 hours. Subsequently, 0.6 part of tert-butyl hydroperoxide that was a free-radical initiator was added, and stirring was further carried out for 40 minutes to complete the reaction. Finally, dilution with water was carried out, thereby obtaining a "surface sizing agent" of 25% (solids concentration).

According to analysis of gel permeation chromatography (pullulan standard), the weight-average molecular weight of an enzymatically treated starch obtained by subjecting the oxidized starch (degree of substitution (DS) of anionic group (COO—): 0.03 to 0.05) to α-amylase treatment before the initiation of polymerization was about 50,000.

Blending in each sizing agent is described below.

Surface sizing agents were prepared in the same manner as in Example 1, except that blending of the components was changed to that of each of Examples 2 to 8 and Comparative Examples 1 to 5 described in Table 1.

The pH, viscosity (mPa·s) and average particle diameter (nm) of the surface sizing agent of each of Examples and Comparative Examples were also measured.

<pH Measurement>

In the pH measuring method, pH at 25° C. was measured by a glass electrode method (pH meter manufactured by HORIBA, Ltd.).

<Viscosity Measurement>

Measurement of viscosity was carried out by a Brookfield rotational viscometer (B-type viscometer manufactured by TOKYO KEIKI INC.), that is, the solids concentration of a sample was adjusted to 25% (W/V), and a sample viscosity was measured at a sample temperature of 25° C.

<Average Particle Diameter Measurement>

In the measurement of average particle diameter, an average particle diameter of a sample was measured by a dynamic light scattering method. Specifically, using Zetasizer NanoZSP manufactured by Malvern Panalytical Ltd., a 173° scattering angle based on 633 nm laser light was measured, and a Z-average particle diameter (cumulant average) was measured.

<Calculation of Degree of Substitution (DS) of Oxidized Starch>

For the degree of substitution (DS) of oxidized starch, weight % of reacted substituents to the sample is expressed as a substitution ratio (%), and an average number of substituted hydroxyl groups per anhydrous glucose residue is expressed as a degree of substitution (DS). M: molecular weight of substituent Degree of substitution (DS)=162×substitution ratio (%)/100M−(M−1) substitution ratio (%)

These measurement results of Examples 1 to 8 and Comparative Examples 1 to 5 of the surface sizing agents are set forth in "Table 1" together with blending composition.

<Drop Sizing Degree Evaluation>

In the "drop sizing degree" evaluation, a drop sizing degree (second(s)) is measured in accordance with a droplet absorbing capacity (dropping method) test (JAPAN TAPPI paper and pulp test method No. 33).

In the "drop sizing degree" evaluation, a water droplet of 5 μL is dropped on a paper, and the time until the water droplet is completely absorbed is measured by a stopwatch, and a larger numerical value is evaluated as a higher sizing effect.

<Pen Writing Sizing Degree Evaluation>

In the "pen writing sizing degree" evaluation, a pen writing sizing degree (seven-grade evaluation) is measured in accordance with a pen writing method (JAPAN TAPPI paper and pulp test method No. 12).

In the "pen writing sizing degree" evaluation, a straight line is drawn using predetermined pen and ink, then a degree

| Sample | Component A (starch) Starch (mass %) | Component B (unsaturated monomer) (mass %) | | | | Component C (ionic unsaturated monomer) (mass %) | Total of components A + B + C (mass %) | pH | Viscosity (mPa·s) | Particle diameter (nm) | Drop sizing (second(s)) | Pen writing sizing | Foam height (mm) | Stability evaluation |
|---|---|---|---|---|---|---|---|---|---|---|---|---|---|---|
| Ex. 1 | 38% | 21% | 41% | 0% | 0% | 0% | 100% | 3.33 | 21.1 | 74 | 15 | 4 | 14 | A |
| Ex. 2 | 38% | 15% | 47% | 0% | 0% | 0% | 100% | 3.34 | 21.8 | 75 | 14 | 5 | 13 | A |
| Ex. 3 | 38% | 28% | 34% | 0% | 0% | 0% | 100% | 3.35 | 23.0 | 79 | 17 | 5 | 13 | A |
| Ex. 4 | 35% | 28% | 35% | 0% | 0% | 2% | 100% | 3.29 | 21.9 | 80 | 18 | 5 | 15 | A |
| Ex. 5 | 37% | 20% | 39% | 0% | 0% | 4% | 100% | 3.17 | 22.4 | 78 | 16 | 5 | 16 | A |
| Ex. 6 | 30% | 20% | 28% | 0% | 20% | 2% | 100% | 3.23 | 16.9 | 78 | 15 | 5 | 15 | B |
| Ex. 7 | 28% | 24% | 48% | 0% | 0% | 0% | 100% | 3.15 | 15.3 | 73 | 15 | 5 | 14 | B |
| Ex. 8 | 38% | 28% | 22% | 10% | 0% | 2% | 100% | 3.33 | 22.2 | 77 | 19 | 6 | 16 | A |
| Comp. Ex. 1 | 30% | 40% | 30% | 0% | 0% | 0% | 100% | 3.36 | 21.9 | 80 | 7 | 3 | 14 | A |
| Comp. Ex. 2 | 45% | 18% | 37% | 0% | 0% | 0% | 100% | 3.46 | 47.4 | 89 | 11 | 4 | 14 | A |
| Comp. Ex. 3 | 38% | 38% | 24% | 0% | 0% | 0% | 100% | 3.37 | 19.7 | 84 | 5 | 3 | 15 | A |
| Comp. Ex. 4 | 38% | 47% | 15% | 0% | 0% | 0% | 100% | 3.38 | 17.5 | 114 | 1 | 2 | 16 | B |
| Comp. Ex. 5 | 38% | 31% | 31% | 0% | 0% | 0% | 100% | 3.36 | 21.9 | 80 | 9 | 4 | 15 | A |

(Preparation of Coating Liquid)

Oxidized starch (manufactured by Oji Cornstarch Co., Ltd., product name: Oji Ace A) was adjusted to have a solids concentration of 30 mass % and gelatinized, and "coating liquids" each having a solids concentration of 5% and each containing 0.2 mass % of any one of surface sizing agents corresponding to Examples and Comparative Examples were obtained.

(Application to Paper)

These coating liquids were each applied to a neutral woodfree paper (basis weight: 65 g/m²) using a size press machine. Next, using a rotary dryer, drying was carried out under the temperature conditions of 105° C. for 1 minute, thereby obtaining "sample papers" for evaluation (sample papers of Examples 1 to 8 and Comparative Examples 1 to 5).

(Evaluation Test)

After the sample papers were each subjected to moisture conditioning for 24 hours in constant temperature and humidity environment (temperature: 20° C., relative humidity: 65%), drop sizing degree and pen writing sizing degree (JAPAN TAPPI paper and pulp test methods No. 12-76) were measured.

of ink bleeding is visually judged and rated, and in seven grades of 0 to 6, a larger numerical value is evaluated as better sizing.

<Foaming Test>

In the "foaming test", the coating liquid was heated to 50° C., thereafter the liquid was stirred by a mixer for 20 seconds, and a "foam height (mm)" at that time was measured.

<Mechanical Stability Test>

In the "mechanical stability test", a hardness of a sample was adjusted to 300 ppm (CaCO₃), and using a homogenizer, the sample was treated at 14,000 rpm at 50° C. for 10 minutes, subsequently the sample was filtered through a 325-mesh wire cloth, and a precipitation amount based on all the solid matters was measured. As a result of the measurement, a sample free from occurrence of dregs was evaluated as A, a sample in which dregs had occurred in an extremely small amount was evaluated as B, and a sample in which dregs had occurred in a large amount was evaluated as C.

As described above, the sample papers of Examples 1 to 8 had large numerical values for the drop sizing degree as compared with Comparative Examples, and also had pen wiring sizing degrees as large as 5 to 6 as compared with the sample papers of Comparative Examples.

From the above, it can be seen that by using the composition for a surface sizing agent of the present invention, a paper having a high drop sizing effect and also having high evaluation of pen writing sizing can be obtained. A paper containing the composition of the present invention has an excellent sizing effect such that the degree of ink bleeding is low while water permeability is suppressed.

Moreover, the composition for a surface sizing agent of the present invention has an appropriate viscosity and small particle diameters at a solids concentration of 25%. From this, it can be seen that since a coating liquid containing the surface sizing agent of the present invention also has good low foamability and mechanical stability, it has good paper coating workability.

The invention claimed is:

1. A surface sizing agent for papermaking, comprising a composition obtained by polymerizing unsaturated monomers with a polymerization initiator without using an emulsifier and a chain transfer agent in the presence of an anionic starch, wherein
   the amount of the anionic starch is 25 to 40 mass % based on the total amount of the anionic starch and the unsaturated monomers,
   the unsaturated monomers comprise at least a styrenic compound and a (meth)acrylic ester compound comprising t-butyl (meth)acrylate, and
   the amount of the styrenic compound is 10 mass % or more and less than 30 mass %, and the amount of the (meth)acrylic ester compound is 20 to 50 mass %, based on the total amount of the anionic starch and the unsaturated monomers.

2. The surface sizing agent according to claim 1, wherein the (meth)acrylic ester compound further comprises a (meth)acrylic acid C1-C8 alkyl ester.

3. The surface sizing agent according to claim 2, wherein the (meth)acrylic acid C1-C8 alkyl ester comprises 50 mass % or more of a (meth)acrylic acid C3-C4 alkyl ester.

4. The surface sizing agent according to claim 1, wherein the (meth)acrylic ester compound further comprises 50 mass % or more of a (meth)acrylic acid C3-C4 alkyl ester.

5. The surface sizing agent according to claim 4, wherein the anionic starch is an anionic starch having been subjected to oxidation treatment and enzymatic treatment.

6. The surface sizing agent according to claim 4, wherein the unsaturated monomers further comprise an ionic ethylene-based unsaturated monomer, and the amount of the ionic ethylene-based unsaturated monomer is less than 10 mass % based on the total amount of the anionic starch and the unsaturated monomers.

7. The surface sizing agent according to claim 1, wherein the anionic starch is an anionic starch having been subjected to oxidation treatment and enzymatic treatment.

8. The surface sizing agent according to claim 7, wherein the unsaturated monomers further comprise an ionic ethylene-based unsaturated monomer, and the amount of the ionic ethylene-based unsaturated monomer is less than 10 mass % based on the total amount of the anionic starch and the unsaturated monomers.

9. The surface sizing agent according to claim 1, wherein the unsaturated monomers further comprise an ionic ethylene-based unsaturated monomer, and the amount of the ionic ethylene-based unsaturated monomer is less than 10 mass % based on the total amount of the anionic starch and the unsaturated monomers.

10. A paper comprising the surface sizing agent for papermaking according to claim 1.

* * * * *